(12) United States Patent
Mashkin et al.

(10) Patent No.: US 9,647,410 B2
(45) Date of Patent: May 9, 2017

(54) MULTIMODE FABRY-PEROT FIBER LASER

(71) Applicant: IPG PHOTONICS CORPORATION, Oxford, MA (US)

(72) Inventors: Andrey Mashkin, Burbach (DE); Fedor Shcherbina, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 14/958,059

(22) Filed: Dec. 3, 2015

(65) Prior Publication Data

US 2016/0087392 A1 Mar. 24, 2016

Related U.S. Application Data

(63) Continuation of application No. PCT/US2014/040754, filed on Jun. 3, 2014.

(60) Provisional application No. 61/830,376, filed on Jun. 3, 2013.

(51) Int. Cl.
*H01S 3/30* (2006.01)
*H01S 3/067* (2006.01)
*H01S 3/094* (2006.01)
*H01S 3/08* (2006.01)
*H01S 3/0941* (2006.01)
*H01S 4/00* (2006.01)
*H05G 2/00* (2006.01)
*H01S 3/082* (2006.01)
*H01S 3/16* (2006.01)
*G02B 6/02* (2006.01)
(Continued)

(52) U.S. Cl.
CPC ............ *H01S 3/0675* (2013.01); *H01S 3/067* (2013.01); *H01S 3/06708* (2013.01); *H01S 3/06716* (2013.01); *H01S 3/0804* (2013.01); *H01S 3/09415* (2013.01); *H01S 3/094003* (2013.01); *H01S 3/094069* (2013.01); *H01S 3/1603* (2013.01); *H01S 4/00* (2013.01); *H05G 2/00* (2013.01); *G02B 6/02057* (2013.01); *G02B 6/0288* (2013.01); *G02B 6/29356* (2013.01); *H01S 3/0826* (2013.01); *H01S 3/094011* (2013.01); *H01S 3/1618* (2013.01)

(58) Field of Classification Search
CPC .. H01S 3/0675; H01S 3/0804; H01S 3/09415; H01S 3/1603; H01S 3/0826; H01S 3/094011; H01S 3/067; H01S 3/06716; H01S 3/06708; H01S 3/094003; H01S 3/094069
See application file for complete search history.

(56) References Cited

U.S. PATENT DOCUMENTS

| | | | |
|---|---|---|---|
| 6,510,167 B1 * | 1/2003 | Jain | H01S 3/0675 372/102 |
| 2005/0175059 A1 * | 8/2005 | Leclair | G02B 6/03622 372/102 |
| 2010/0080502 A1 * | 4/2010 | Nishikawa | G01N 21/774 385/12 |

* cited by examiner

*Primary Examiner* — Kinam Park
(74) *Attorney, Agent, or Firm* — Yuri B. Kateshov, Esq.; Timothy J. King, Esq.

(57) ABSTRACT

A multimode ("MM") fiber oscillator is configured with MM active fiber doped with light emitters, a pair of MM passive fibers spliced to respective opposite ends of the MM active fiber, and a plurality of MM fiber Bragg gratings ("FBG") written in respective cores of the MM passive fibers to provide a resonant cavity. The passive and active fibers are configured with respective cores which are dimensioned with respective diameters matching one another and substantially identical numerical apertures.

20 Claims, 5 Drawing Sheets

(51) Int. Cl.
  *G02B 6/028* (2006.01)
  *G02B 6/293* (2006.01)

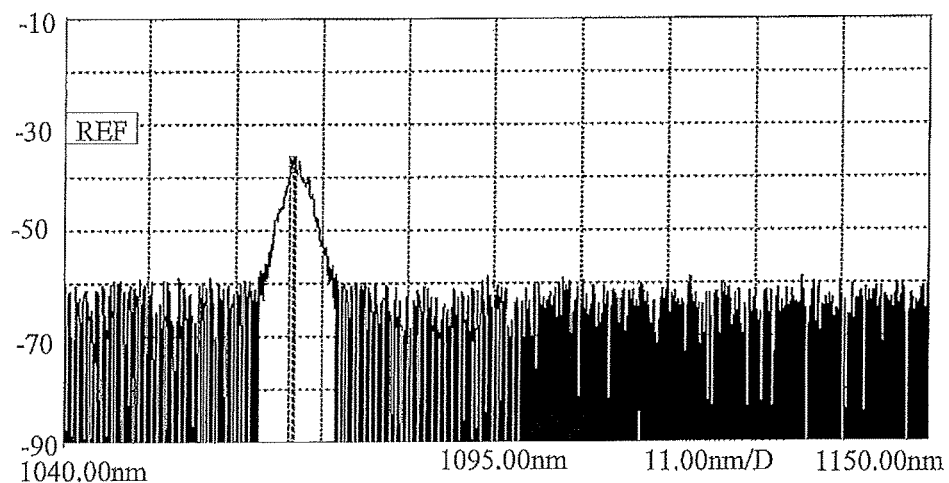
FIG. 3A
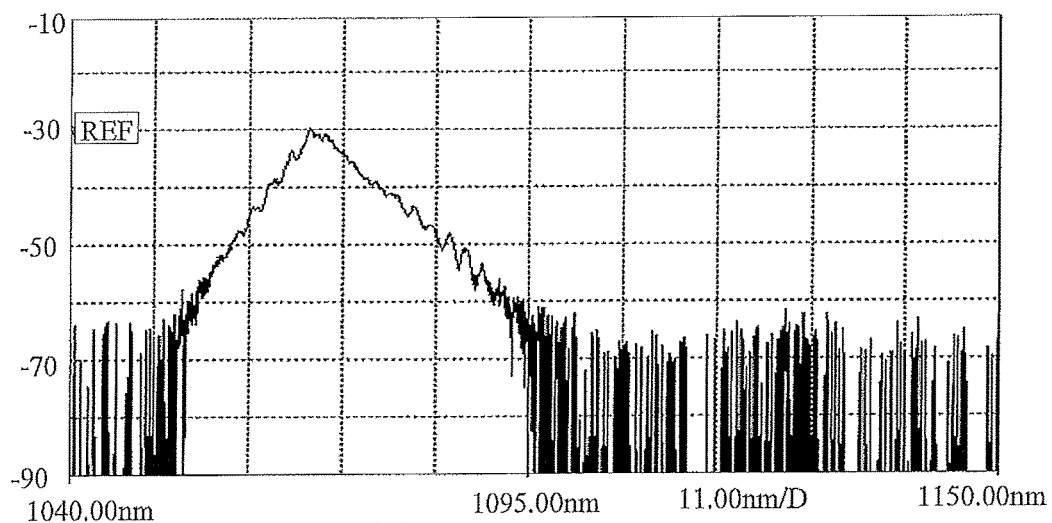
FIG. 3B
FIG. 4
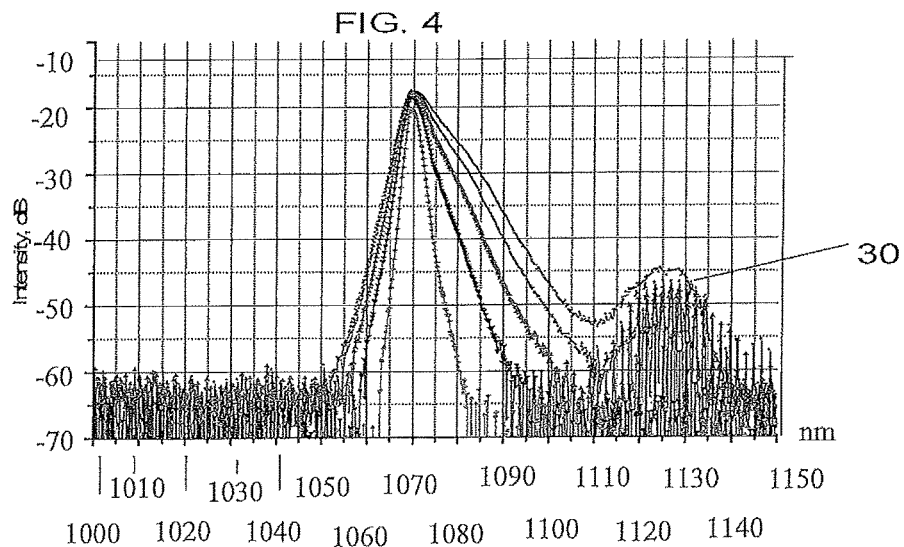

FIG. 5A
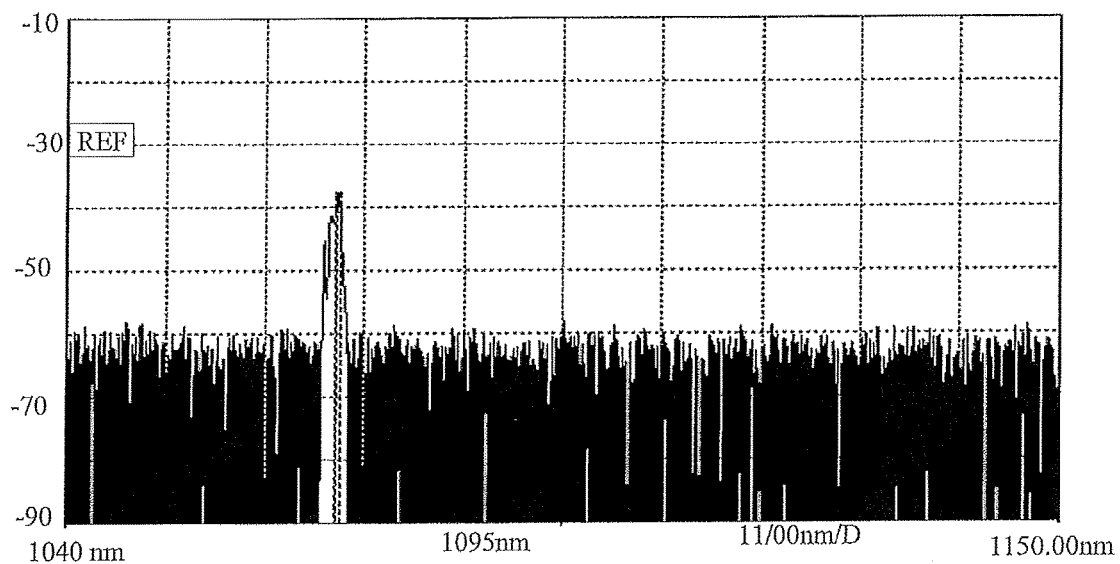
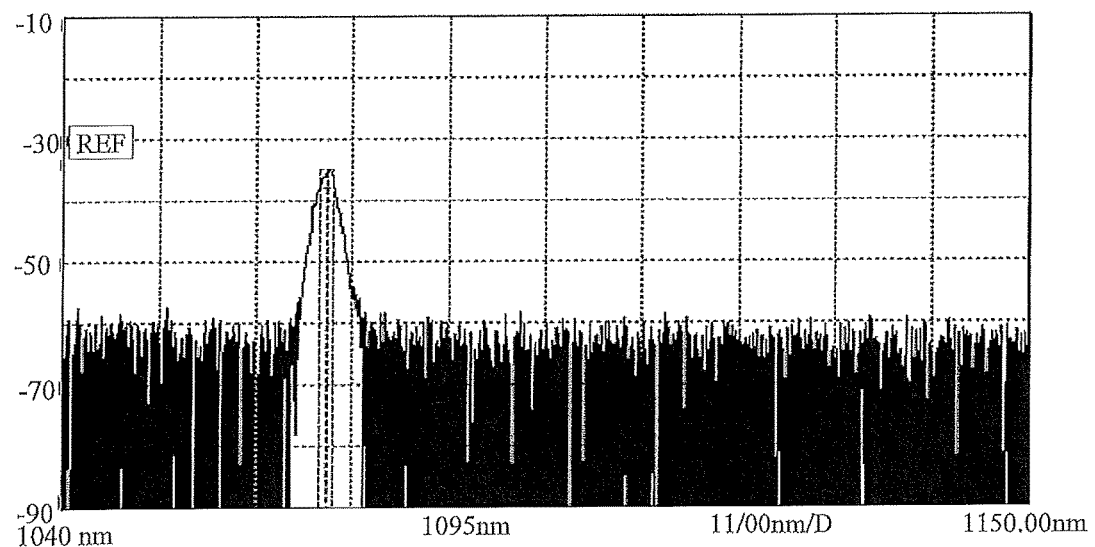
FIG. 5B

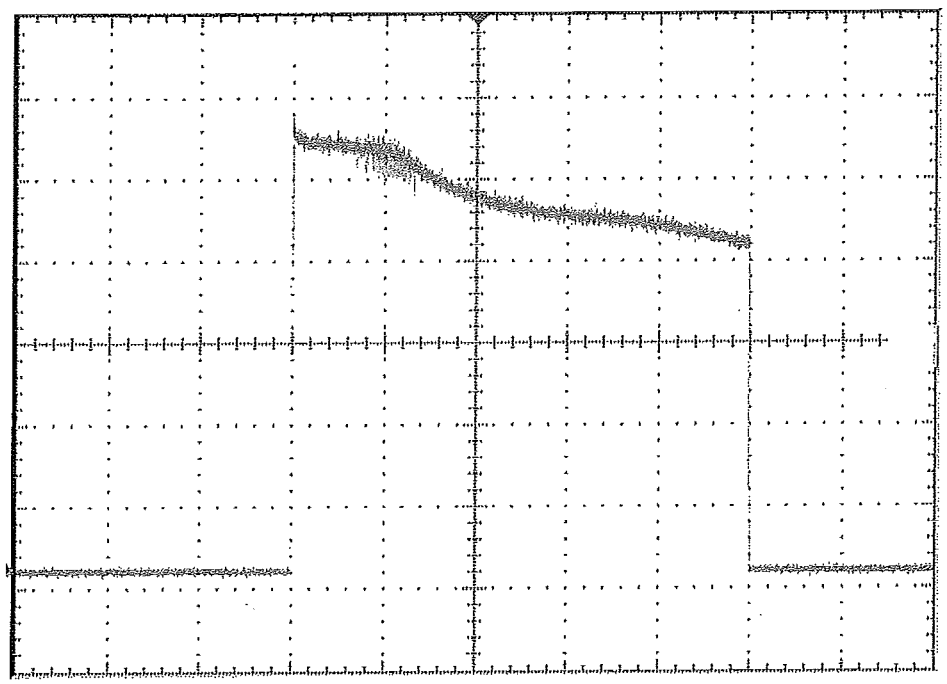
FIG. 6A
FIG. 6B
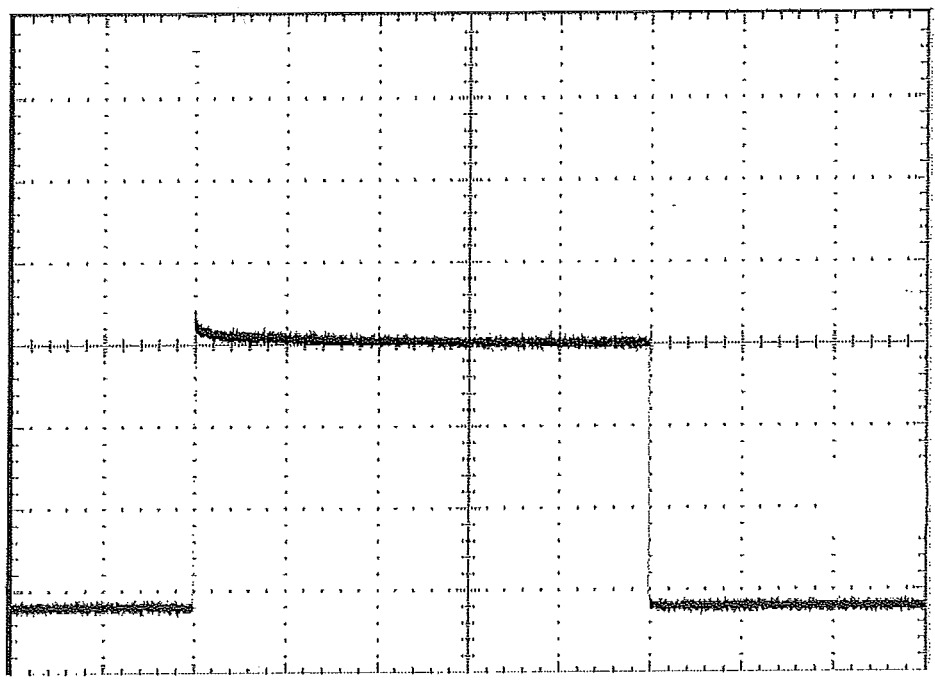

MULTIMODE FABRY-PEROT FIBER LASER

BACKGROUND OF THE DISCLOSURE

Field of the disclosure

This disclosure relates to fiber lasers and, more particularly, to a multimode fiber Fabry-Perot fiber laser having a resonant cavity which defined between multimode fiber gratings and capable of emitting multimode light in a narrow spectral line.

Disclosure Prior Art Discussion

Traditionally, fiber oscillators are configured with single mode ("SM") active and passive fibers or other mode filter components providing generation of substantially a single transverse mode. One of ordinary skilled in the laser art is well aware of advantages offered by SM fiber oscillators. Yet SM fiber lasers also face a few challenges some of which are discussed immediately below.

As known, there are limitations imposed on the geometry of SM active step-index fibers. The SM core cannot be limitlessly enlarged since it practically would not be able to support only a SM upon reaching about a 30 micron core diameter. Yet larger core diameters are desirable for generating of high power SM laser beams. The primary cause for such a limitation includes various non-linear effects ("NLEs") which, despite concerned efforts on part of the scientific and manufacturing communities, remain a problem. In particular, NLEs are damaging for high power fiber lasers and amplifiers.

As well known to one of ordinary skill in the fiber laser art, NLEs are one of the major factors liming the power scaling of fiber lasers. Different NLEs have the following in common:

A. The pulse optical power at which they set on (referred to as "threshold power" and coinciding with the maximum pulse power achievable) is proportional to the fiber core area and inversely proportional to the fiber length. In other words, long fibers of small core used in fiber lasers favor NLEs; and B. NLEs cause unwanted spectral broadening of the laser emission spectrum and/or wavelength conversion, and optical feedback, power instabilities and ensuing potential damages to the optical components. In particular, the unwanted broadening observed in response to the increased power density is a result of four wave mixing ("FWM") NLE. Also, a Raman NLE is manifested practically by detrimentally affecting affection the operation of fiber devices.

The undesirable formation of long-period fiber gratings ("LPFGs") may also be disadvantageous. In this type of structure, the signal light interacting with the LPFG is coupled into cladding modes where it rapidly attenuates due to absorption and scattering. Accordingly, the signal may experience a loss which, regardless of how low it can be, is clearly undesirable.

An unstable laser operation may be observed due to the excitation of high order modes, if a gain medium includes low mode active fibers. Typically, a SM laser is configured with the low mode active fiber having its opposite ends fused to respective SM passive fibers. If mode field diameters of SM and fundamental mode of respective passive and active fibers are not matched, the excitation of high order modes is difficult to suppress. However, such low-mode active fibers are the choice of design in practically all high power lasers/amplifiers configured to emit a beam in substantially a single, fundamental mode. As a consequence additional manufacturing efforts should be applied to have the MFDs of respective SM and MM fibers substantially match.

For SM lasers with low-mode active fibers, the output beam has a close to Gaussian intensity profile characterized by a pointed top. Such a beam is not always ideal for certain applications. Frequently, a uniform intensity distribution associated with the profile's flat top is advantageous. In this case, SM lasers should be additionally configured with beam shaping optics which increases the overall cost of the systems.

A need therefore exists for a MM fiber oscillator having a configuration successfully meeting the above-disclosed challenges.

SUMMARY OF THE DISCLOSURE

This need is satisfied by the disclosed oscillator having a Fabri-Perot configuration. In particular, the disclosed oscillator is configured with a multiple transverse mode ("MM") step-index active fiber. The opposite ends of the active fiber are coupled to respective MM passive fibers. The resonant cavity is defined between two MM fiber Bragg gratings written in respective cores of MM passive fibers.

The components of the disclosed oscillator configuration are all selected and designed to minimize a threshold for nonlinear effects and, as a consequence, produce a narrow line emission. The flexibility offered by vast a vast selection of parameters of the disclosed oscillator allows adjusting an output power to desired level, select the desired wavelength and produce the desired narrow wavelength line tailored for a variety of specific applications.

BRIEF DESCRIPTION OF THE DRAWINGS

The above and other disclosed features and advantages will become more readily apparent with the assistance of the following drawings, in which:

FIGS. 3A and 3B show typical optical output emission spectra of a typical prior art SM Yb-doped fiber laser operating at different peak power levels.

FIG. 4 demonstrates the generation of Raman NLE observed in a prior art typical SM fiber laser with output power increase.

FIGS. 5A and 5B are typical spectra of the MM Fabri-Perot laser of FIG. 1 operating at respective different output powers.

FIG. 6A and 6B illustrate power stability in a single pulse output by the MM fiber laser of FIG. 1 and SM laser of prior art, respectively.

SPECIFIC DESCRIPTION

Figure 1:
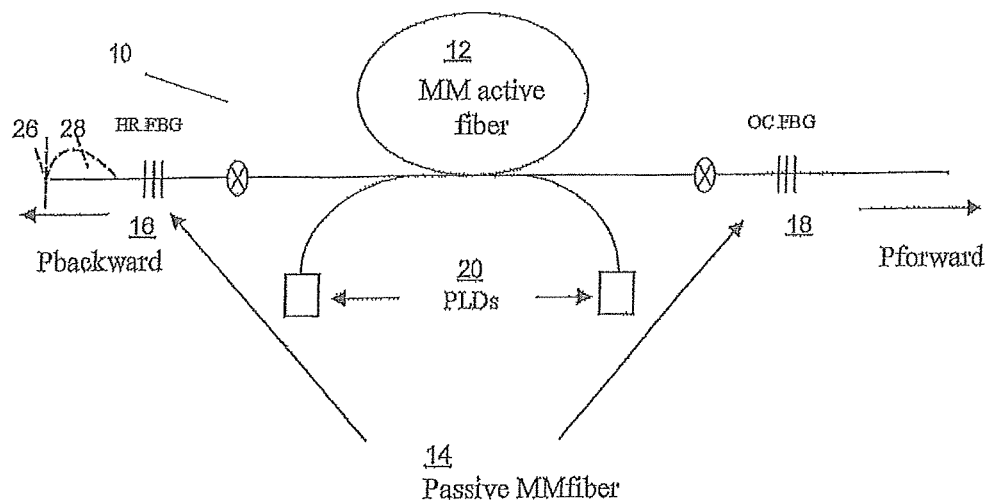
FIG. 1 is an optical schematic of the disclosed MM fiber oscillator.

Reference will now be made in detail to embodiments of the invention. Wherever possible, same or similar numerals are used in the drawings and the description to refer to the same or like parts or steps. The drawings are in simplified form and are not to precise scale. Unless specifically noted, it is intended that the words and phrases in the specification and claims be given the ordinary and accustomed meaning to those of ordinary skill in the fiber laser arts. The word "couple" and similar terms do not necessarily denote direct and immediate connections, but also include mechanical optical connections through free space or intermediate elements. For the purposes of clarity only, all of the below discussed computer generated graphs are obtained during the experimentation with a MM ytterbium laser. However, the basic approach disclosed hereinbelow may be successfully applied to various rare earth ions.

FIG. 1 illustrates the inventive MM fiber laser or oscillator 10 configured with a gain medium which includes a MM fiber 12 doped with light emitters. As known, the light emitters include ions of rare earth elements selected from ytterbium ("Yb"), erbium ("Er"), neodymium ("Nd"), thulium ("Tm"), holmium ("Ho"), praseodymium ("Pr"), cerium ("Ce") yttrium ($Y^{3+}$), samarium ($Sm^{3+}$), europium ($Eu^{3+}$), gadolinium ($Gd^{3+}$), terbium ($Tb^{3+}$), dysprosium ($Dy^{3+}$), and lutetium ($Lu^{3+}$) and various combinations of these.

The active step index fiber 12 is configured with a core capable of supporting a great number of transverse modes typically associated with a core diameter greater than 20. As one of ordinary skill in the fiber laser art knows, a step-index fiber cannot continue to support a single mode once its core diameter exceeds a 30 μm diameter. The configuration of active fiber 12 further may have one or more claddings which surround the core in a manner well known to one of ordinary skill.

The oscillator 10 is further configured with two MM passive fibers 14 fused to respective opposite ends of active fiber 12. The MM passive fibers each are configured with a core diameter and numerical aperture substantially matching those of the active fiber 12. A pump 20 includes one or a plurality of MM pigtailed laser diodes arranged in a side-pumping scheme and having an emission peak which corresponds to the absorption peak of the selected doping ions. The combination of passive, active and pump fibers combined as shown in FIG. 1 and, optionally, placed in a housing (not shown) constitutes a single gain block.

The laser 10 has a Fabri-Perot configuration with a resonant cavity defined between spaced strong and weak reflectivity MM fiber Bragg gratings ("FBGs") 16 and 18, respectively. The FBGs 16 and 18 are written in respective MM passive fibers 14. While FBGs can be written in the active fiber, it may be technologically challenging.

Multi-kilowatt implementation of single mode ("SM") high power fiber lasers has been achieved and is already available on the market. The state of the art demonstration of continuous wave SM operation is currently about 10 kW and prediction of SM operation levels exceeding 30 kW have been made. While the capability of fiber lasers to maintain an excellent beam quality at high power is undisputed, there is little concern of the laser linewidth as they generally used for processing of materials that have broad absorption band.

However, certain applications require a selective spectral line. For example, laser processing of titanium and titanium alloys with an Yb fiber laser in the presence of inert gas requires narrowing a typically broad spectral linewidth of a high power 1070 nm SM fiber laser since the use of a standard Yb SM fiber laser resulted in the generation of undesirable soot. The explanation of the soot formation can be found in the overlap between a broad emission spectral linewidth of laser light and absorption center of inert gas. Accordingly, the spectral linewidth of the laser light should to be narrowed to avoid the absorption peak which may be realized by a high cost, single frequency SM fiber laser.

As known, one of the main reasons for line broadening in SM fiber lasers is the presence of nonlinear effects ("NLE"), such as Raman scattering and four wave mixing, which become more pronounced with the power increase. The threshold for NLE can be lowered by increasing a core diameter and cavity length. Hence MM fibers characterized by large diameter cores and smaller cavity lengths are characterized by relatively narrow spectral linewidth.

Figure 1A:
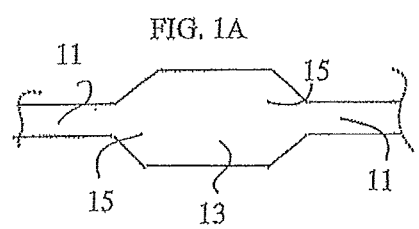
FIG. 1A is an exemplary multimode active fiber configured in accordance with one of the embodiments of the present disclosure.

The active MM fiber 12 of the present disclosure fully meets the requirement for a relatively high NLE threshold. In one embodiment, the configuration of the MM active fiber 12 may include a typical cylindrical fiber. In the other embodiment, the active fiber may be configured with a double bottleneck shape, as shown in FIG. 1A, which has two relatively small diameter input and output core regions 11, a central relatively large diameter central amplifying core region 13 and two tapered regions 15 bridging the opposite ends of the central region with respective opposing ends of the ends core regions. The increased diameter of amplifying region is instrumental in a further increase of core diameter, reduction of fiber length and ultimately elevation of NLE threshold and narrowing of spectral linewidth. The cladding of MM active fiber shown in FIG. 1A may be configured with a typical cylindrically shaped cross-section or may have the same double bottleneck shape as the core. The spectral linewidth that would meet many industrial requirements, such certain types of material laser processing, for the disclosed laser may vary from 0.02 nm to about 10 nm. The desired spectral line may be obtained by careful selection of, among others, the core diameter, length of resonant cavity, configuration of MM Bragg gratings, dopant concentration.

Figure 2:
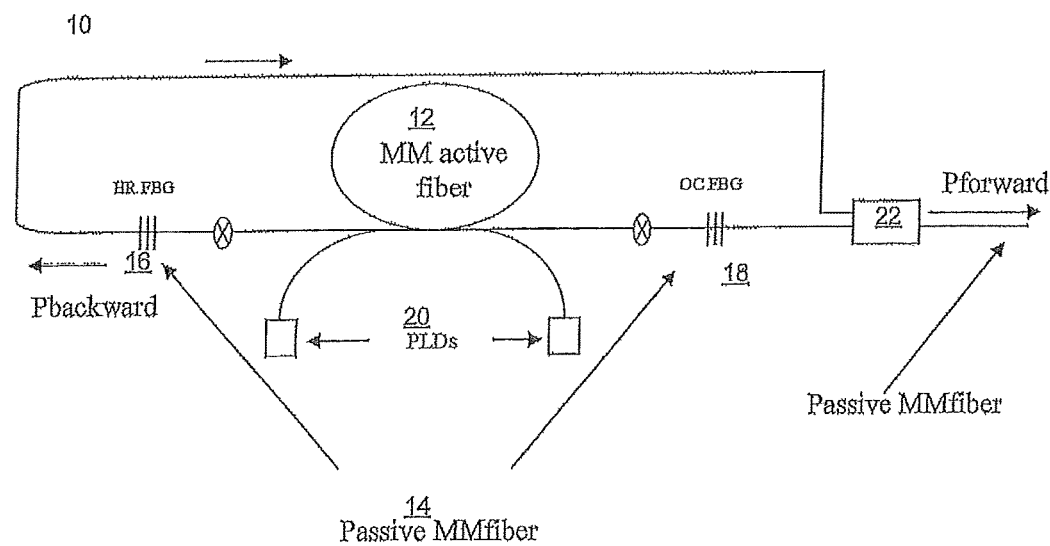
FIG. 2 is an optical schematic of the disclosed MM fiber oscillator configured with a means for utilizing light bled through a high reflection FBG.

Referring to FIG. 2 in addition to FIG. 1, the strong MM FBG 16 may not provide the desired reflection of all modes and part of light bleeds through it. To minimize, recover or prevent this loss, MM laser 10 may have several configurations, as disclosed below.

As shown in FIG. 2, upstream MM passive fiber 14 is formed with a loop for guiding bled through light to a combiner 24 located after weak FBG 18 along a signal path. The combiner 24 is configured to combine the output light signal with the light lost through bleeding and output the combined light further along the path.

FIG. 1 illustrates two alternative embodiments of a means for minimizing the loss of light. For example, the free faucet of upstream MM fiber 14 may be provided with a mirror 26 capable of reflecting all modes bled through strong FBG 16. Alternatively, upstream MM passive fiber may have a looped free end 28 guiding the bled through light back into the cavity. In both embodiments the bled through light is substantially recovered and returned back into the resonator.

The advantages of the disclosed oscillator 10 over a SM fiber laser are well supported by extensive experimentation. The experimental configuration included a CW or current modulated CW laser (also known as quasi CW laser) Yb MM laser. The latter is configured to emit a series of pulses due to direct modulation of the diode pump laser(s) current of pump 20. The test results have been compared to a SM Yb laser configured with a SM active fiber which has its opposite ends spliced to respective SM passive fibers each of which has a SM FBG written in its core. The comparative results are graphically shown in the following computer-generated FIGS. 3A-B, 4, 5A-B, 6A-B and 7A-B.

FIGS. 3A-B illustrate the frequency spectrum of the SM Yb laser obtained at two different output peak power levels:

2000 W and 3000 W, respectively. The broadening of the bandwidth with the increase of output peak power from 2000 W to 3000 W is a highly undesirable phenomenon caused by, among others, four wave mixing nonlinear ("FWM") effect. The FWM is not the only NLE observed during the power increase in a QCW SM fiber lasers as becomes readily apparent immediately below.

FIG. 4 illustrates Raman NLE observed in the QCW SM fiber laser. As can be seen, the Raman peak 30 is very well articulated and thus extremely detrimental to the desired power output of the SM laser.

FIG. 5A and 5B illustrate the spectrum of the disclosed MM fiber laser operating in a quasi-continuous regime at the same 2000 and 3000 W peak power levels as the SM laser of FIGS. 3A and 3B. Specifically referring to FIG. 5B, one of ordinary skill can easily see that a relatively insignificant spectral broadening and practically complete absence of Raman emission advantageously distinguish the MM laser from the SM laser of FIGS. 3A and 3B. Depending on the length of cavity, configuration of FBGs, light emitter concentration, pump power, wavelength and other parameters, the linewidth of multi-kilowatt lasers can range between 0.02 nm to about 10 nm. In fact, on average, the linewidth in a MM laser, which is configured in accordance with the disclosure and compared to a similarly configured SM laser operating at the same power as the disclosed laser, is at least one order of magnitude smaller.

FIGS. 6A and 6B illustrate the generation of noise and power drop in a pulsed output by the QCW SM laser and disclosed QCW MM laser, respectively. While both the noise and power drop are significant in the pulse emitted by SM laser of FIG. 6A due to the excitation of high order modes, the MM laser of FIG. 6B has a stable output and low level of noise.

Figure 7A:
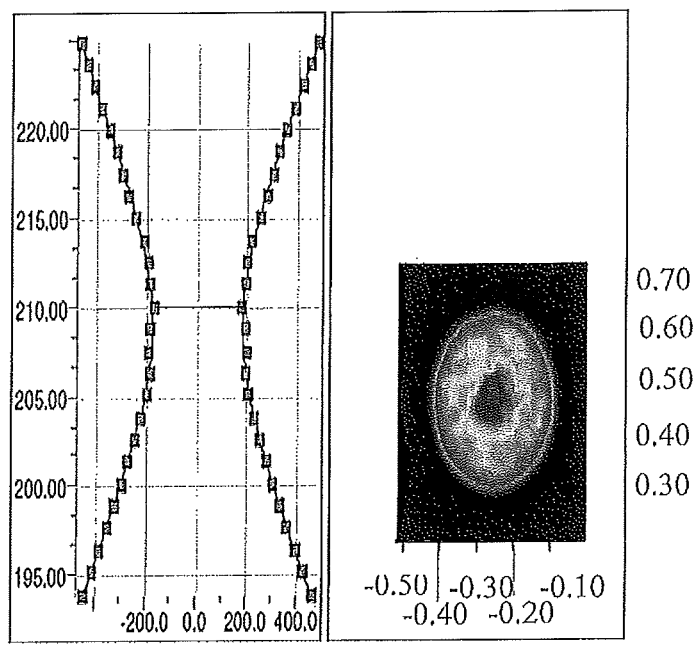
FIGS. 7A and 7B demonstrate typical output beam parameters of respective MM fiber laser of FIG. 1 and SM fiber laser oscillator of prior art configured with a 100 pm diameter MM output fiber.
Figure 7B:
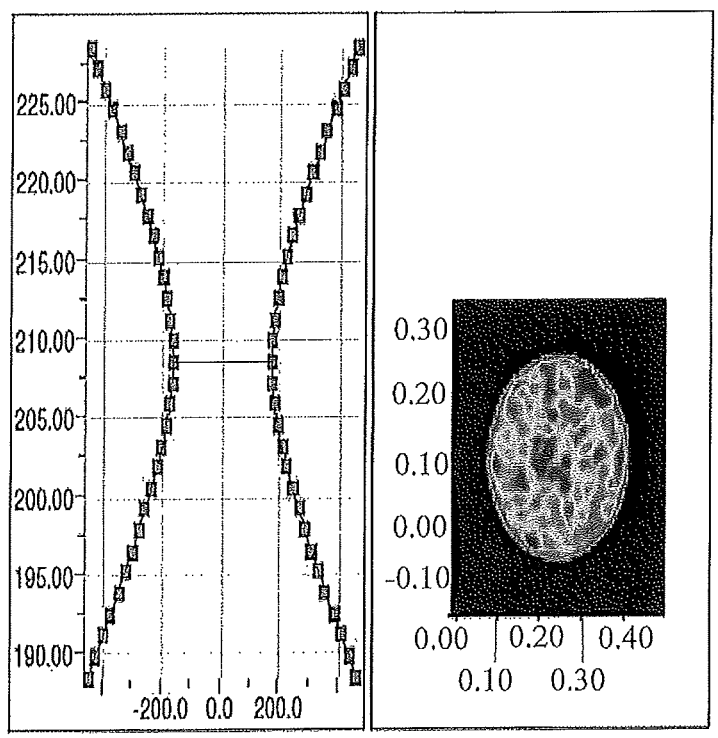

FIGS. 7A and 7B illustrate the beam quality obtained at the outputs of respective MM laser and SM lasers. Both laser configurations have respective identically structured large diameter output passive fibers. Despite the MM gain medium, the beam quality parameter of the MM output (5.038) does not significantly differ from that of the SM laser (3.652).

Based on the foregoing, the cost of laser systems configured with the disclosed MM laser is substantially reduced. For example, a high power QCW laser system incorporating a SM laser typically has a master oscillator/power amplifier ("MOPA") configuration. In other words, such a system is configured with at least two gain blocks. The same system incorporating only a powerful MM oscillator, which is scaled to emit the desired output, is significantly less costly and structurally simpler than the prior art laser systems. Not only does the laser system with the MM laser output a beam having the desired power, but the quality of the beam is comparable to that of the system with the MOPA configuration.

In summary, the MM lasers of the present invention have a number of advantages including, among others, the following:

a. substantially reduced detrimental influence of NLEs on power scaling;
b. low splice losses because there is no need to match MFDs of respective active and passive fibers upon splicing these fibers to one another;
c. wide range of core diameters and core's refractive indices which allows obtaining the desired parameters of a waveguide;
d. acceptable beam quality which does not impermissibly differ from that of the SM laser with a MM output fiber or from a combined output beam of several SM lasers;
e. excitation of high order modes and refractive index modulation in MM active fiber do not entail high levels of noise and noticeable power drops; and
f. cost-effective and simple configuration of laser systems incorporating the disclosed MM laser.

It will be apparent to those skilled in the art that various modifications and variations can be made in the presently disclosed MM fiber laser and laser system incorporating the latter. The disclosed laser may be used as a pump for other light amplifying devices or in high harmonic generation schemes or as standalone device generating an output which may reach kW levels. Thus, it is intended that the present disclosure cover the modifications and variations of this disclosure provided they come within the scope of the appended claims and their equivalents.

The invention claimed is:

1. An CW or QCW multimode ("MM") Fabri-Perot all fiber oscillator comprising:
   a MM active fiber provided with a monolithic core which is doped with light emitters;
   two MM passive fibers spliced to respective opposite ends of the MM active fiber; and
   MM fiber Bragg gratings ("FBG") written in respective cores of the MM passive fibers and defining a resonant cavity therebetween, wherein the laser is configured to output light emitted at a desired wavelength and having a narrow linewidth which varies between 0.02 and 10 nm.

2. The MM fiber oscillator of claim 1, wherein the MM active and passive fibers are configured with respective monolithic cores, the cores having respective opposing ends dimensioned with respective diameters which substantially match one another.

3. The MM fiber oscillator of claim 2, wherein the core of the MM active fiber has a cylindrical cross-section with a uniform diameter between opposite ends thereof or double-bottleneck-shaped cross section.

4. The MM fiber oscillator of claim 1, wherein the MM active and passive fibers are configured with respective numerical apertures substantially matching one another.

5. The MM fiber oscillator of claim 1 further comprising a pump operative to side-pump the MM active fiber, the pump including one or a plurality of MM laser diodes.

6. The MM fiber oscillator of claim 1, wherein the light emitters include ions of rare earth elements which are selected from the group consisting of ytterbium ("Yb"), erbium ("Er"), neodymium ("Nd"), thulium ("Tm"), holmium ("Ho"), praseodymium ("Pr"), cerium ("Ce") yttrium ($Y^{3+}$), samarium ($Sm^{3+}$), europium ($Eu^{3+}$), gadolinium ($Gd^{3+}$), terbium ($Tb^{3+}$), dysprosium ($Dy^{3+}$), and lutetium ($Lu^{3+}$) and combinations of these.

7. The MM fiber oscillator of claim 1, wherein the MM FBGs include high and low reflectivity fiber gratings defining therebetween a resonant cavity.

8. The MM fiber oscillator of clam 7, wherein the upstream MM passive fiber with the high reflectivity FBG is configured to guide light which leaks through the high reflectivity FBG back into the resonant cavity.

9. The MM fiber oscillator of claim 1 further comprising a combiner coupled to the downstream MM passive fiber, the upstream MM passive fiber being configured to guide light which leaks through the high reflectivity FBG to the combiner, wherein the combiner receives a free end of the upstream MM passive fiber to combined the light exiting the resonant cavity through the low reflectivity FBG and the leaked light.

10. The MM fiber oscillator of claim 1 further comprising a mirror provided on a faucet of the upstream MM passive fiber, the mirror being configured to reflect light leaking through the high reflectivity FBG back into the cavity.

11. A fiber laser system comprising at least one gain block configured with:
   a MM active fiber doped with ions of one or more rare-earth elements;
   a pair of MM passive fibers spliced to respective opposite ends of the MM active fiber;
   spaced high reflectivity and low MM fiber Bragg gratings ("FBG") written in respective cores of the MM passive fibers and defining a resonant cavity therebetween, wherein the MM active, passive and FBGs define a MM Fabri-Perot laser; and
   a pump operative to side-pump the active fiber, wherein the fiber laser system is configured to output one or more kW-level light emitted at a desired wavelength and having a narrow spectral linewidth which at least one order of magnitude smaller than that of a single mode laser which operates at a same power as the MM Fabri-Perot laser.

12. The fiber laser system of claim 11, wherein the pump is configured with a plurality of laser diodes and operative to output a train of pulses.

13. The fiber laser system of claim 12, wherein a MM output of the gain block is pulsed, the output light pulses each having a substantially uniform power level over an entire duration of the pulse.

14. The MM fiber laser system of claim 11, wherein the MM active and passive fibers are configured with respective cores, the cores having respective opposing ends dimensioned to have substantially matching diameters.

15. The MM fiber laser system of claim 11, wherein the MM active and passive fibers are configured with respective numerical apertures substantially matching one another.

16. The MM fiber laser system of claim 11, wherein the gain block is configured to emit a continuous output.

17. The MM fiber laser system of claim 11 further comprising a combiner coupled to a downstream MM passive fiber formed with the low reflectivity FBG, an upstream MM passive fiber being configured to guide light which leaks through the high reflectivity FBG to the combiner, wherein the combiner receives a free end of the upstream MM passive fiber to combine the light exiting the resonant cavity through the low reflectivity and high reflectivity FBGs.

18. The MM fiber laser system of claim 11, wherein an upstream MM passive fiber having the high reflectivity FBG has a free end provided with a reflective element configured to backreflect light leaking though the high reflectivity FBG back into the resonant cavity.

19. The MM fiber laser system of claim 14, wherein the core of the MM active fiber has a cylindrical cross-section with a uniform diameter between opposite ends thereof or double-bottleneck-shaped cross section.

20. The MM fiber laser system if claim 11, wherein the narrow spectral line varies between 0.02 and 10 nm.

* * * * *